United States Patent [19]

McGibbeny et al.

[11] 4,178,579
[45] Dec. 11, 1979

[54] REMOTE INSTRUMENTATION APPARATUS

[75] Inventors: James R. McGibbeny; John D. Lydick, both of Manhattan Beach, Calif.; Anthony G. Linowiecki, Houston, Tex.; Robert R. Harms, Rancho Palos Verdes, Calif.

[73] Assignee: TRW Inc., Cleveland, Ohio

[21] Appl. No.: 729,645

[22] Filed: Oct. 5, 1976

[51] Int. Cl.² .................................... G01V 1/40
[52] U.S. Cl. .................................. 340/856; 307/127; 340/857
[58] Field of Search .......... 340/18 CM, 18 LD, 18 R; 33/312; 325/113; 324/1 (U.S. only); 307/127; 361/194, 210; 73/170 A; 335/234, 153

[56] References Cited

U.S. PATENT DOCUMENTS

| | | | |
|---|---|---|---|
| 3,223,968 | 12/1965 | De Shazo, Jr. | 324/1 |
| 3,252,131 | 5/1966 | Vogel | 340/18 R |
| 3,315,224 | 4/1967 | Ferguson | 340/18 R |
| 3,340,500 | 9/1967 | Boyd et al. | 340/18 CM |
| 3,483,749 | 12/1969 | Francis | 73/170 A |
| 3,495,212 | 2/1970 | Brock | 340/18 CM |
| 3,533,034 | 10/1970 | Allen | 335/234 |

Primary Examiner—Maynard R. Wilbur
Assistant Examiner—Lawrence Goodwin
Attorney, Agent, or Firm—Blakely, Sokoloff, Taylor & Zafman

[57] ABSTRACT

A self-referencing sensing and control apparatus which may be used advantageously in any industrial installation in which an A.C. powered device, such as the down-hole motor in a submersible pumping system or a plunger relay, is remotely located and in which it is desired (i) to monitor certain parameters, such as temperature and pressure, and/or (ii) to control certain operational functions, such as the state of flow valves and latching means, at the remote site. The power cable used to carry A.C. power to the remotely operating device is also used to carry instrumentation and control signals from local control and readout equipment to an instrumentation package installed at the remote site. The present invention comprises switching means to selectively couple and decouple one or more sensors (or control means) in the instrumentation package to and from the A.C. operating device and the power cable, thereby permitting high voltage testing of the A.C. device and cable, or other tests.

30 Claims, 5 Drawing Figures

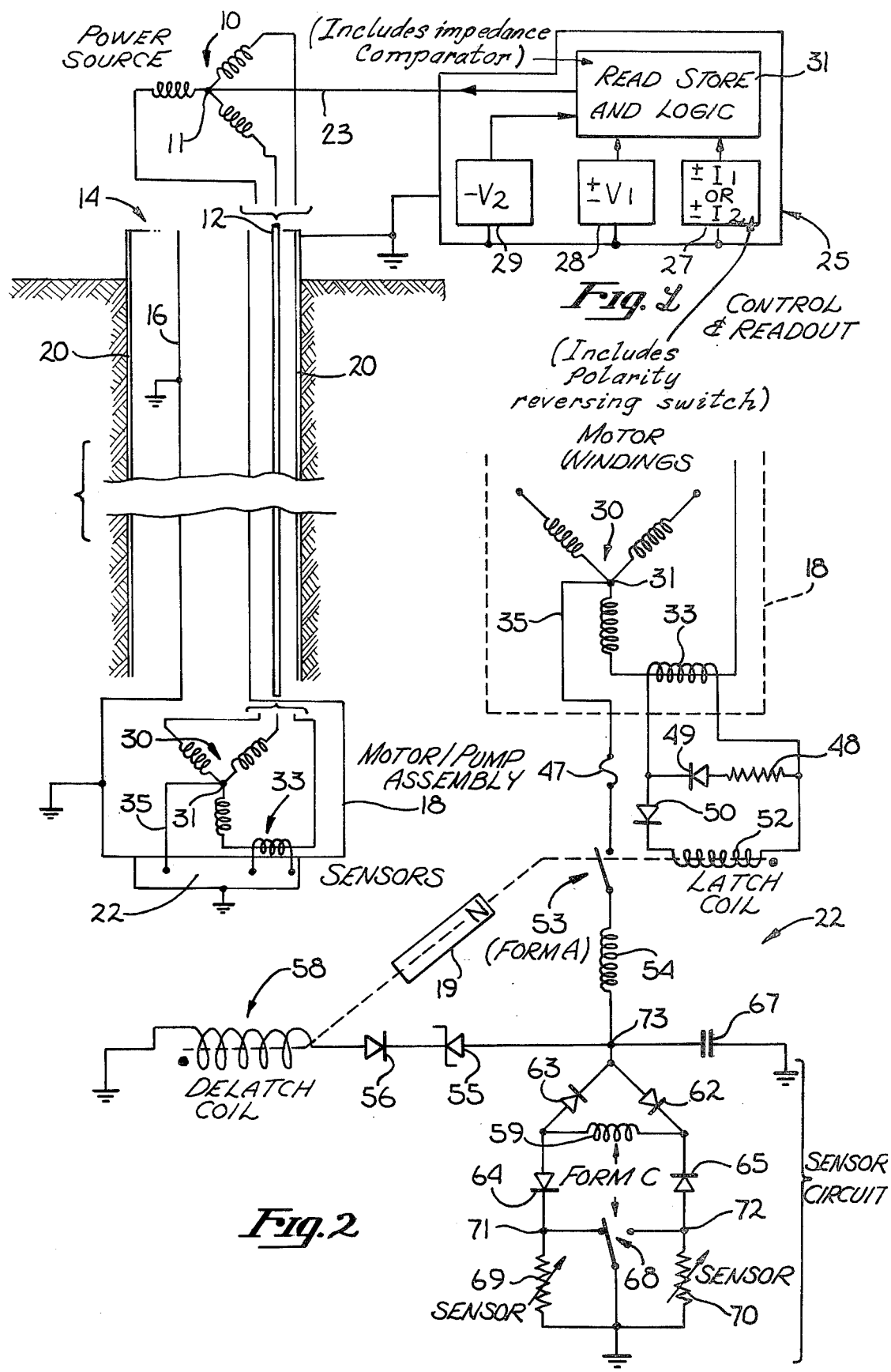

REMOTE INSTRUMENTATION APPARATUS

BACKGROUND OF THE INVENTION

1. Field of the Invention

This invention relates to the field of electrical instrumentation and control, and more particularly, to an instrumentation apparatus which enables the sensing of physical parameters and the control of operational functions in a remotely located A.C. powered installation.

2. The Prior Art

Numerous industrial installations exist in which an A.C. powered motor and pump assembly or other alternating current device is operated at a remote location to which access is difficult, costly and/or impractical, if not impossible. An example of such an installation is the motor and pump assembly of a submersible pumping system operating near the bottom of a deep bore or hole in the ground (referred to as "down-hole"). In such installation, there is often a requirement to monitor certain physical parameters present in the down-hole environment, particularly the temperature and pressure therein. Moreover, in such installations, the requirement to remotely control certain operational functions, such as the flow of fluid through a down-hole, solenoid controlled valve also arise.

In some systems of the prior art, sensors are installed in the down-hole portion of the installation and electrically coupled to readout and recording equipment located at the surface, through instrumentation wiring, separate from the cable wiring which conducts power to the down-hole A.C. motor. Experience has shown, however, that such separate instrumentation wiring is unreliable; i.e., that it is fragile and easily damaged, particularly in a down-hole pumping environment. To overcome this problem, some systems of the prior art utilize the wiring of the power cable to carry instrumentation and control signals between the surface equipment and the down-hole or remotely located sensors (or control devices). This approach eliminates the problem of fragile instrumentation wiring in that the power cable is typically rugged and reliable. Examples of such prior art systems are disclosed in U.S. Pat. Nos. 3,284,669 and 3,340,500 issued to C. A. Boyd and C. A. Boyd et al respectively.

Prior art systems which utilize the power cable for transmission of instrumentation and control signals, however, have one significant shortcoming attributable to the fact that the instrumentation apparatus is permanently coupled to the power cable. This shortcoming arises in those applications where it becomes necessary to test the A.C. operating device, e.g., the down-hole motor, and the power cable at high voltage levels. In a submersible pumping installation, the test voltages may be as high as 2500 volts D.C. or RMS. In such application, the permanent coupling of the down-hole instrumentation package to the power cable prevents the conduct of such high voltage testing because either (i) the sensors in the instrumentation package cannot withstand the high voltages or (ii) the sensor circuits therein present a low impedance path to ground, thereby precluding the conduct of meaningful tests of the motor and power cable.

The present invention overcomes the foregoing limitation of the prior art by providing remotely controlled switching means for coupling and decoupling the down-hole (remote) instrumentation package to and from the power cable and the down-hole (remote) motor or other A.C. powered operating device. Thus, the present invention obtains the advantage of transmitting instrumentation and control signals over the power cable while, at the same time, not precluding high voltage testing of the motor and cable. Moreover, this invention contemplates utilizing the same switching means to selectively switch between multiple sensor and control circuits within the remotely located instrumentation package.

While down-hole sensing circuits, coupled to surface equipment through a power cable, are known in the prior art, no system heretofore has successfully combined the sensor and control circuits and switching means disclosed by this invention. Furthermore, the particular sensor and control circuits, and the particular switching means disclosed herein are not taught by the prior art. More specifically, this invention discloses a combination of (i) particularly advantageous latching and delatching circuits to control and operate the switching means, and (ii) a sensor circuit which, by a configuration of diodes, directs a sensor readout current through a path which first by-passes the sensor, in a "reference" mode, and by reversing the direction of such current, directs the same through a sensor, in a "measurement" mode. Since each sensor used is of the type which changes its resistance in response to a parameter of interest, the above-described sensor circuit eliminates measurement errors due to changes or drifts in the resistances or impedances of the various circuit components, cable and other conducting means in the readout current path. This is so because the present invention does not make an absolute measurement of a sensor's resistance, but rather, a measurement of the difference between the resistance of the entire readout current path with and without the sensor.

While the prior art shows down-hole switching means, such as the rectifier bridge and relay disclosed in U.S. Pat. No. 2,915,697 granted to E. S. Cornish, it does not show the particular combination of sensing, control and switching means disclosed herein.

An additional advantage of the present invention is that it is capable of electrically interfacing with motors of any horse-power and operating voltage. For example, the described apparatus may be employed, without alteration, with motors operating at 400 to 3300 volts (A.C.) and with currents in the range of 15 to 150 amps per phase.

SUMMARY OF THE INVENTION

The present invention finds utility in industrial or other installations wherein (i) an A.C. powered device is remotely located; (ii) it is desired to monitor certain parameters of interest, such as temperature and pressure, at the remote site; and/or (iii) it is desired to remotely control certain operational functions there. This invention enables the accurate sensing of such parameters of interest and the control of various functions at the remote site. Sensing and control currents (and/or potentials) are transmitted between control and monitoring equipment at a local site and instrumentation installed at the remote site by means of the power cable which carries the A.C. power to the remotely located A.C. device; thus, there is no requirement for any additional electrically conducting instrumentation and/or control lines to the remote instrumentation. Moreover, the invented apparatus enables the sensors and control devices, such as solenoids, to be selectively coupled and decoupled to and from the A.C. powered device.

An application in which the present invention is particularly suited is in a down-hole, submersible pumping installation driven by a single phase or three phase A.C. powered motor. In a preferred embodiment of the invented apparatus, adapted to the submersible pumping system, two sensors are coupled and decoupled between ground and the neutral node of the down-hole, three phase induction motor's windings through a first switch. Such neutral node is electrically coupled, via the A.C. power cable, to the neutral node of the windings of a three phase power source on the surface. The latter neutral node, in turn, is electrically coupled to local monitoring and control equipment comprising, in part, constant current sources, voltage sources, switching, reading and data storage means (referred to hereinbelow as the "control and readout unit"). Thus, a closed loop current path is achieved between the control and readout unit on the surface and the down-hole sensors through the power cable and a common ground, preferably earth ground.

The control of the first switch (for coupling and decoupling the sensors from the neutral node of the down-hole motor windings) is by means of a latch coil circuit and a delatch coil circuit. The preferred switch for this application is a reed switch having a permanent magnet which, while of insufficient magnetic strength to close the switch, is sufficient to maintain or latch the switch in the closed position once so closed. A latch coil, whose magnetic field is additive to that of the permanent magnet, is used to move the switch to the closed (i.e., coupling) position. The latch coil is electrically coupled to a current transformer whose primary is one of the lines carrying power to one of the windings of the down-hole motor. Thus, when A.C. current is flowing through the motor windings, the field of the latch coil causes the first switch to move to its closed position, where it is maintained thereafter (until delatched) by the permanent magnet. In the closed position, the sensors are coupled to the neutral node of the down-hole motor windings and the above-described closed current path is completed, thereby enabling the parameters to which the sensors are responsive to be measured.

In the delatch coil circuit of a preferred embodiment of the invention, a delatch coil is coupled in series with a rectifier diode and a Zener diode. By the application of a predetermined potential, (from the control and readout unit on the surface via the power cable), the Zener diode is caused to conduct, thereby energizing the delatch coil. The delatch coil is wound about the permanent magnetic so that its magnetic field is in opposition to that of the permanent magnet; thus, when the A.C. power is off and the detach coil is energized, the field strength of the delatch coil overcomes that of the permanent magnetic. This causes the first switch to open and the sensors to be decoupled from the down-hole motor windings.

In other embodiments of the present invention described below, alternate circuit configurations are disclosed for controlling the state of the first switch, that is, for coupling and decoupling of the sensors from the down-hole motor windings.

In the preferred embodiment of the invented apparatus, the sensors are each of the type which changes its electrical resistance as a known function of the parameter of interest. Typically, the function is a proportional one over a reasonable range of values. The relationship between the parameter of interest and the resistance of the sensor can be accurately determined by conventional calibration means.

The resistance of each sensor is accurately measured by first measuring the resistance of the entire current path without any sensor being serially included therein (a "reference" mode), and then measuring the resistance of the path with a sensor being serially included (the "measurement" mode). The difference (increase) in the resistance of the current path in the measurement mode as compared to that in the reference mode is the resistance of the sensor. The foregoing resistance measurements are made by passing a constant current (generated in the control and readout unit on the surface) in a first direction through the current path and through a sensor circuit comprising first and second sensors. By means of diodes in the sensor circuit, the current is directed through a second switch (preferably a reed switch) to ground, thereby by-passing both sensors. For the measurement mode, the direction of the constant current is reversed, and by means of diodes in the sensor circuit, it is directed through one of the sensors (and back to the current source) over a substantially identical current path. Conventional instrumentation in the control and readout unit is used to measure the resistance of the current path, both with or without the sensor, to obtain the difference, and from such difference to determine the magnitude of the parameter of interest.

The second sensor is placed into the current path by switching the state of the second switch by means of a second and larger constant current, generated in the control and readout unit and passed through the current path, momentarily augmented by the application of a second predetermined potential (also generated in the control and readout unit). The second constant current and the current induced momentarily by the second predetermined potential flow through a coil which controls the state of the second switch. The second predetermined potential, however, is selected to be too low to operate the delatch coil circuit.

The present invention contemplates the inclusion of electro-mechanical control means, in addition to sensors, for the operation of devices such as control values and hydraulic latches. Such control means, typically solenoids, are selectively energized by the constant currents generated in the control and readout unit and flowing through the above-described current path between the surface (local) site and the down-hole (remote) site. By increasing the number of poles on the first switch, the latter may be used to selectively couple either such control means or a sensor circuit to the down-hole motor windings and, thus, to the current loop.

Thus, it is an object of the present invention to provide an instrumentation apparatus which communicates with down-hole sensors over power cables and which provides at least two channels of information, so that, by way of example, temperature and pressure may be sensed.

It is a further object of the present invention to provide an instrumentation apparatus which is capable of accurately operating over a wide range of temperatures and pressures and which does not decrease the reliability of the power cable, motor, pumping system, or the like.

A still further objective of the present invention is to provide a means of self-referencing to eliminate the effect of changes in the characteristics, such as resistance, of component elements of the apparatus and conducting lines when exposed to unknown or varying temperature and pressure.

A still further objective of the present invention is to provide a means of selectively performing alternative functions, such as the measurement of parameters other than pressure, temperature and the operation of electromechanical devices such as solenoid valves and the like.

It is still another object of the present invention to provide an instrumentation apparatus which may be employed with motors of different horsepower, current, and voltage ratings, and wherein measurements may be made with or without the motor or other A.C. device operating.

Another object of the present invention is to provide a down-hole instrumentation apparatus which employs a power cable as a means for communicating with above ground measuring equipment, and wherein high voltage testing of this cable and the motor or other A.C. device may be made without adversely affecting the instrumentation package.

BRIEF DESCRIPTION OF THE DRAWINGS

FIG. 1 illustrates, in general diagrammatic form, a portion of a three phase, A.C. powered submersible pumping system in which the invented apparatus is installed.

FIG. 2 is a schematic diagram showing the remote (down-hole) portion of the present invention, comprising a sensor circuit, switching means for selectively coupling the sensor circuit to a down-hole three phase induction motor, and the latch coil and delatch coil circuits which operate the switching means.

DETAILED DESCRIPTION OF THE INVENTION

Figure 3:
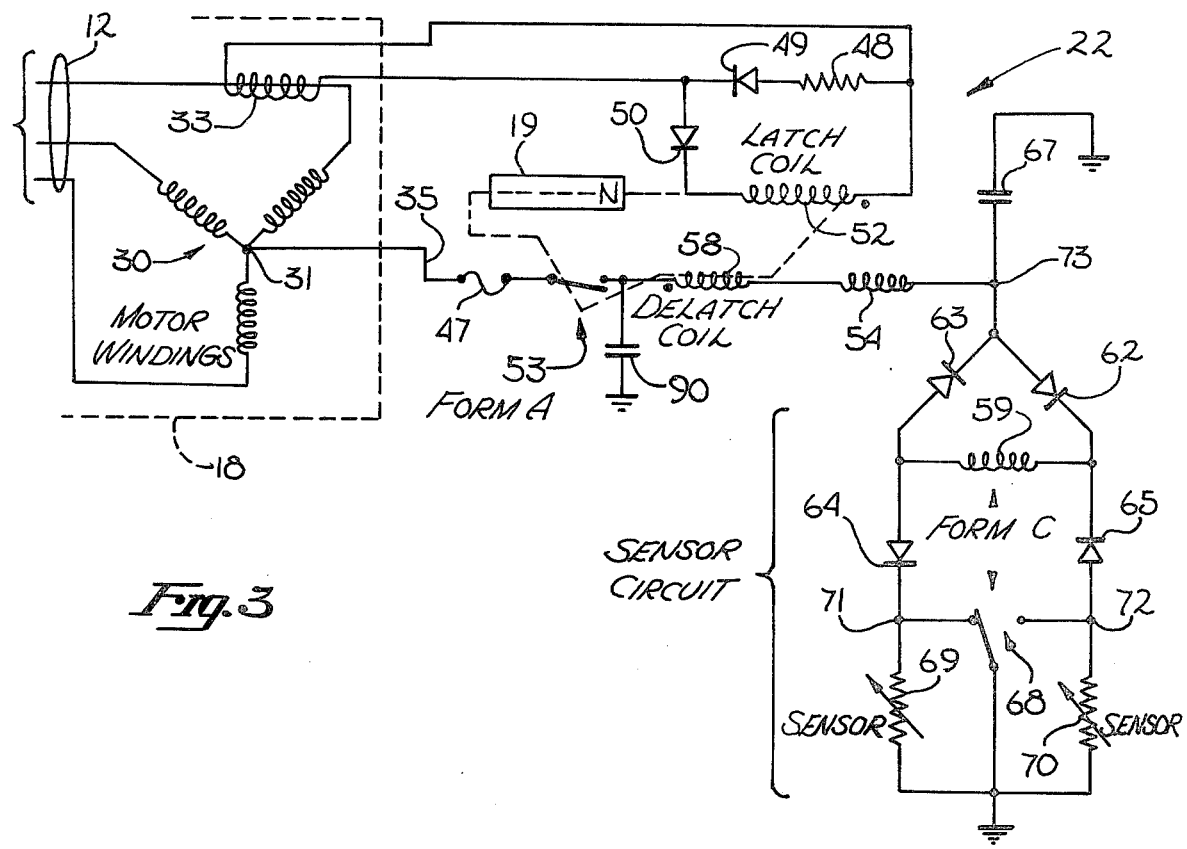
FIG. 3 is a schematic diagram showing an alternate embodiment of the remote sensor package portion of the present invention wherein the delatch coil is coupled in series with the sensor circuit and switching means instead of as shown in FIG. 2.

An instrumentation system and apparatus is described which is particularly useful for (i) remotely sensing physical characteristics of interest such as, for example, the pressure and temperature in a down-hole or submersible well pumping system, and/or (ii) remotely controlling the state of switching or other control devices, such as, for example, solenoid actuated valves or solenoid latches. As will be apparent from the following detailed description, the inventive concepts disclosed herein are applicable to numerous other instrumentation applications. In the description, like elements in the various FIGURES will be designated by the same numerical designations.

A presently preferred embodiment of the invented apparatus is used advantageously in an electric motor powered submersible pumping system to sense certain down-hole parameters, such as pressure and temperature, and to communicate the same to ground measuring equipment remotely located on the surface. In this embodiment, the down-hole sensors are selectively coupled to the ground measuring equipment through the power cable which carries alternating current (A.C.) power to a submersible motor and pump assembly, typically three-phase power. However, it will be apparent to those skilled in the art that the invented apparatus may likewise be employed with a submersible pumping system driven by a single-phase A.C. motor or other alternating current device, such as, for example, a plunger relay.

The presently preferred embodiment of the subject invention is now described with reference to FIGS. 1 and 2. The submersible pumping system includes a bore or hole 14, casing 20 and a tubing string 16 disposed within the hole 14. A submersible motor and pump assembly 18 is coupled to the lower end of the tubing string 16. (The motor is shown symbolically by three-phase A.C. windings 30, Y-connected and having a neutral, ungrounded node 31; the pump is not shown). A sensor package 22 is electrically coupled to (i) the neutral node 31 of motor windings 30 through electrically conducting line 35, and (ii) to the secondary of a current transformer 33 which utilizes as a single turn, primary winding any one of the three-phase current paths provided by motor windings 30. The housing of the sensor package 22 is mechanically coupled to the housing of the motor and pump assembly 18 and both housings are tied to earth ground. Also coupled to earth ground are the tubing string 16 and casing 20.

On the surface, a power source 10 is shown as an A.C. three-phase, Y-connected set of windings having a neutral, unground node 11. (A neutral may also be obtained from a three-phase delta-connected set of windings by using a three-phase inductor, well known in the art, to obtain an "artificial" neutral node.) Also shown on the surface is control and readout unit 25, described more fully below. Electrically conducting line 23 couples the control and readout unit 25 to the neutral node 11 of the windings of power source 10. The circuit ground and housing of control and readout unit 25 are electrically coupled to earth ground.

Power from power source 10 is carried to the down-hole motor windings 30 by a power cable 12 which extends down-hole through hole 14. Thus, the down-hole sensor package 22 is electrically coupled to the surface located control and readout unit 25 through a circuit comprised of line 35, down-hole motor windings 30, power cable 12, power source windings 10, line 23 and earth ground.

With reference to FIG. 2, the circuitry comprising the sensor package 22 is now described. The sensor package 22 includes three circuits: (i) a latch coil circuit; (ii) a delatch coil circuit; and (iii) a sensor circuit. The sensor circuit, described in detail below, is electrically coupled to the neutral node 31 of down-hole motor windings 30 through line 35 and series connected fuse 47, switch 53 and an LC filter comprised of inductor 54 and capacitor 67. As shown in FIG. 2, the inductor 54 is coupled in series with the switch 53 and fuse 47, while one side of capacitor 67 is connected to earth ground (through the housing of sensor package 22).

The fuse 47 is employed to ensure that the operation and performance of the motor and pump assembly 18 are independent of the presence of the sensor package 22. Thus, in the event of a failure, e.g., a short circuit, within the sensor package 22, the momentary surge of high current through the motor windings 30 would cause fuse 47 to open and decouple the sensor package 22 from the windings 30. In addition, the fuse 47 is also employed to protect the motor windings 30 from failure or malperformance in the event that any point within the windings 30 or along the conductors of cable 12 becomes grounded to the tubing string 16, thereby shorting out all or a portion of one phase of the windings. Since the down-hole motor windings 30 are ungrounded, any one of its three phases could become grounded, through a cable or other short, without substantially affecting the motor's three-phase performance if the sensor package 22 were not electrically coupled to the motor winding's neutral node 31. However, when so coupled, the sensor package 22 provides an additional path to ground which introduces a potential for motor failure or malperformance. The opening of the fuse 47 decouples the sensor package 22 and thereby eliminates the potential for failure or malperformance under the foregoing circumstances.

As indicated above, the electrically conducting line 35 is coupled through fuse 47 to switch 53, a high breakdown voltage single-pole, single-throw, normally opened (Form A) switch. Switch 53 is preferably implemented by a reed switch because of the ability of reed switches to function with reasonable reliability in the adverse environment of a down-hole pumping operation. While this preferred embodiment of the invented apparatus discloses the use of reed switches, it should be understood that the invention is not so limited and that those skilled in the art may elect to use other switches or switching means presently or hereafter available. Switch 53 is incorporated in the sensor package 22 to enable the sensor circuit thereof to be decoupled from the down-hole motor windings 30 (by means of a voltage generated in the control and readout unit 25, as described below). The purpose of such decoupling is to enable the motor and cable 12 to be subjected to high voltage A.C. or D.C. testing without a risk of damage to the sensor circuit. (Such high voltage testing of down-hole motors and their power cabling is a practice in the industry.) The structure and operation of the latch coil and delatch coil circuits, used in conjunction with switch 53, are now explained.

The reed switch 53 is influenced by the magnetic field strength of a permanent magnet 19 therein, the strength of which is not sufficient to place the reed switch 53 in a closed position; however, it is sufficient to hold the switch in the closed position once it is closed. Thus, a latch coil 52 and a delatch coil 58, disposed in polarity opposition around the magnet 19, are employed to open and close the switch 53.

The latch coil circuit receives power from the secondary of current transformer 33, which employs any one of the three-phase current paths of motor windings 30 as a single turn, primary winding. The magnetic core of this transformer is designed to easily saturate at low motor currents. This minimizes the size of this current transformer and provides an energy limit at its output. Moreover, since this current transformer easily saturates, it may be employed with a plurality of different motors; that is, with large and small horsepower motors. A series connected resistor 48 and diode 49 are coupled across the secondary winding of the transformer 33. In addition, a series connected diode 50 and latch coil 52 are also coupled across the secondary of the transformer 33 in parallel to resistor 48 and diode 49. When the downhole motor windings 30 receive three-phase A.C. power from the source 10, A.C. current flows through each of the windings, and, thus, through the current path which serves as the primary winding of current transformer 33. As a result thereof, an alternating voltage is produced at the secondary of transformer 33. Diode 50 permits a current to flow in only one direction through the latch coil 52. This direction is chosen such that the current through the latch coil 52 produces a magnetic field which augments the magnetic field of the permanent magnet 19 sufficiently to close the reed switch 53. As previously indicated, once this reed switch is closed, the permanent magnet 19, without the aid of the magnetic field of latch coil 52, will retain the switch in a closed position. The diode 49 and resistor 48 are employed to prevent a large potential from being applied to diode 50 in the breakdown direction of diode 50; the resistor 48 is employed to limit the current through the diode 49. Thus, once A.C. power is carried to the motor and pump assembly 18 from power source (via power cable 12), switch 53 is latched to its closed position by the latch coil 52, thereby coupling the sensor circuit of sensor package 22 to the neutral node 31 of down-hole motor windings 33 until the delatch coil circuit it activated, as described below. In the closed position of switch 53, the sensor circuit is electrically coupled to the neutral node 31 of motor windings 30 through the LC circuit comprised of inductor 54 and capacitor 67. The purpose of this filter is to filter out the A.C. power and noise produced by the motor unit of motor and pump assembly 18.

The delatch coil circuit is now described. It comprises the series connected combination of (i) a Zener diode 55, having its cathode connected to the input 73 of the sensor circuit of the sensor package 22; (ii) a diode 56 connected to the anode of the Zener diode 55 so as to conduct current in the breakdown direction of Zener diode; and (iii) the delatch coil 58 connected between diode 56 and ground. In order to decouple the sensor package from the motor windings 30, the A.C. power to the motor windings 30 is first turned off. Then, a potential designated as $-V_2$ is applied to the power cable 12 from control and readout unit 25 (via line 23), causing a negative potential to appear at point 73 sufficient in magnitude to cause the Zener diode 55 to conduct. The resulting current that flows through diode 56 and the delatch coil 58 produces a magnetic field in the coil 58 in opposition to that of permanent magnet 19 and sufficient in strength to unlatch the reed switch 53, thereby decoupling the sensor circuit from the motor windings 30. The energy stored in capacitor 67 produces a continuation current through the delatch coil 58 after reed switch 53 opens and potential $-V_2$ is removed from point 73, preventing chattering in the reed switch. Note that the potential induced across the delatch coil 58 by the operation of latch coil 52 is blocked from the input 73 of the sensor circuit by either diode 56 or Zener diode 55.

The sensor circuit of the sensor package 22 is now described. In the embodiment of FIG. 2 the sensor circuit comprises two sensors 69 and 70, shown symbolically as variable resistors. Sensors 69 and 70 are of the type which manifest a change in electrical resistance as a known function of a physical parameter of interest, such as temperature or pressure. Such sensors are well known in the industry and are commercially available. A single-pole, double-throw (Form C) switch 68 is utilized to select which of the sensors, 69 or 70, is to be activated; i.e., which parameter is to be measured. As is the case with switch 53, a reed switch is used to implement sensor selecting switch 68, but the invention is not limited to such a reed switch.

One terminal of each sensor and the common lead reed of the switch 68 are coupled to circuit ground (which is earth ground). The second terminal of sensor 69, one terminal of the reed switch 68, and the anode of a diode 64 are coupled to a node 71. In a similar manner, the second terminal of the sensor 70, the cathode of a diode 65 and a second terminal of the reed switch 68 are coupled to a node 72. An actuating coil 59 of switch 68 is coupled between the cathode of diode 64 and the anode of diode 65. In addition, another diode 63 is coupled in the forward direction between (i) the juncture of the cathode of diode 64 and one side of activating coil 59 and (ii) the input node 73 of the sensor circuit, while a second diode 62 is coupled in the forward direction between (i) said input node 73 and (ii) the junction of the anode of diode 65 and the other side of coil 59.

Before describing the operation of the sensor circuit of sensor package 22, it is necessary to describe the currents and voltages output by the control and readout unit 25 located on the surface. The control and readout unit 25 comprises (i) a conventional D.C. current source 27 which provides constant currents for measuring the resistance of the entire current path (comprised of electrically conducting line 23, power source windings 10, power cable 12, down-hole motor windings 30, electrical conducting line 35, fuse 47, switch 53, the LC filter and the sensor circuit of sensor package 22) both with and without either sensor 69 or 70; (ii) two conventional D.C. power supplies 29 and 28 which respectively provide momentary D.C. potentials for the purposes of delatching switch 53 and selectively switching the common lead of switch 68 from node 71 to node 72 of the sensor circuit; and (iii) read, store and logic means 31 which provides the means for selectively providing the foregoing D.C. currents and potentials onto electrically conducting line 23 and for reading and storing the measured (sensed) data. The particular configuration of control and readout unit 25 is considered to be a matter of design choice, well within the capability of electrical engineers of ordinary skill. Thus, while the functional characteristics of control and readout unit 25 are described in sufficient detail to enable an engineer of ordinary skill to design a suitable configuration, no specific design is shown nor needs to be shown to enable those skilled in the art to practice this invention.

D.C. current source 27 selectively furnishes two levels of constant conventional current, $I_1$ or $I_2$, flowing out from the current source 27 to the sensor circuit, designated as the + direction, or flowing into the current source 27 from the sensor circuit, designated as the − direction. D.C. power supply 28 provides a momentary D.C. voltge, designated as $V_1$, having either positive + or negative − potential, used to switch reed switch 68 from node 71 to node 72, while D.C. power supply 29 provides a momentary negative voltage, designated at $-V_2$, used to delatch reed switch 53 for the purpose of decoupling the sensor package 22 from the down-hole motor windings 30. The potential of $V_2$ is always negative and its magnitude is greater than that of $V_1$ for reasons which will be explained below.

The operation of the sensor circuit is now described. There are two modes of operation with respect to the measurement of the resistance of each of the sensors 69 and 70 (which resistances are functions of the parameters of interest respectively). In the first mode of operation, designated the "reference" mode, the resistance of the entire current path, comprising electrically conducting line 23, power source windings 10, power cable 12, down-hole motor windings 30, electrical conducting line 35, fuse 47, switch 53, the LC filter, the sensor circuit *without* either sensor 69 or 70 and the return path through earth ground, is measured. In this mode, to obtain the reference mode resistance for sensor 70, the read, store and logic means 31 of the control and readout unit 27 couples the constant current $+I_1$ from source 27 to line 23 (the + symbol indicating conventional current flowing to the down-hole sensor package 22). When the current reaches the input node point 73 of the sensor circuit, it is blocked by diodes 63 and 65, and as a result, it flows through diode 62, coil 59 of switch 68, diode 64 and the reed of switch 68 to earth ground, and through earth ground back to current source 27. (It should be noted that the magnitude of constant current $I_1$ flowing through coil 59 is not sufficient to move the reed of the reed switch 68 from its stable position. Moreover, it should be further noted that the positive potential at input node 73, produced by the constant current $+I_1$ reverse biases diode 56 so that no current flows through the delatch coil 58). In read, store and logic means 31, the resistance of the entire current path, without either sensor 69 or 70, is measured and stored for subsequent comparison with the resistance measured in the second mode of operation of the invented apparatus, designated as the "measurement mode". The read, store and logic means 31 may utilize a conventional voltmeter to measure the resistance of the foregoing current path, the resistance being the voltage measured from line 23 to earth ground, divided by the constant current $I_1$.

In the measurement mode, it is necessary to direct the constant current $I_1$ through substantially the same current path as in the reference mode, except for the series inclusion of sensor 70. This is accomplished by reversing the direction of the constant current $I_1$ so that it flows upward from the down-hole sensor package 22 into the current source 27 (such current being designated as $-I_1$). The reversal of the flow of current $I_1$ is done by conventional switching means provided in read, store and logic means 31. The constant current $-I_1$ is blocked from upward flow through the sensor circuit by reverse biased diodes 64 and 62. Thus, its only path through the sensor circuit is through sensor 70, diode 65, coil 59 and diode 63, and thence through the remainder of the current path to constant current source 27 in the control and readout unit 25 on the surface. The resistance of this path is measured and stored in read, store and logic means 31 for comparison with the resistance measured in the reference mode.

The difference in the measured resistance of the current path in the reference mode and in the measurement mode (the latter being greater) is substantially due to the resistance of the sensor 70. This is so because the current path in both modes is the same, except for (i) the inclusion of sensor 70 in the measurement mode and (ii) the negligible differences in the forward resistances of different, albeit similar, diodes (diodes 62 and 64 in the reference mode and diodes 63 and 65 in the measurement mode). The resistance of the sensor 70 has a known relationship to the parameter of interest (by virtue of a prior calibration of the sensor), typically a proportional relationship. (It should be noted that, as in the measurement mode, the magnitude of current $-I_1$ is not sufficient to cause the switch 68 to change from its stable position. Moreover, it should be further noted that the negative potential at input node 73, produced by the constant current $-I_1$, is not sufficient to overcome the Zener barrier, i.e., to cause the Zener diode to conduct; thus, no current flows through the delatch coil 58 in the measurement mode).

Comparison of the resistance of the current path measured in the reference mode and then in the measurement mode may be accomplished in read, store and logic means 31 by a conventional comparator circuit which is capable of (i) storing the reference voltage produced by current $+I_1$, and (ii) algebraically adding this value to the measured (negative) voltage produced by current $-I_1$, the sum being directly relatable to the resistance of the sensor 70 and, thus, to the magnitude of the parameter of interest to which sensor 70 is responsive.

Thus, as the foregoing description indicates, the sensor circuit of the present invention is substantially independent of changes or drifts in the resistance (or impedance) of the current path, any errors due to such changes being eliminated by means of the reference mode measurement which precedes the measurement of the parameter of interest.

In order for the parameter of interest sensed by sensor 69 to be measured, it is necessary for the reed of switch 68 to be switched to its terminal which is in connection with node 72. This switching function is accomplished by means of constant current $-I_2$ (greater in magnitude than $I_1$) and the momentary application of potential $-V_1$. By means of conventional switching circuits in the read, store and logic means 31, constant current $-I_2$ is selectively output from current source 27 onto line 23 and thence to the down-hole sensor package 22. The current $-I_2$ initially flows from ground through sensor 70; diodes 65 and 63 and the coil 59 of switch 68. The magnitude of current $I_2$ through coil 59 is not necessarily sufficient to cause switch 68 to change its position. However, by the momentary application of potential $-V_1$ onto line 23 (by means of th selective switching in read, store and logic means 31) $-V_1$ is applied to input node 73 through the current path, thereby causing the current flowing through coil 59 to be momentarily increased above the magnitude of $I_2$. As a result of this increased current (for a sufficient duration), the reed of switch 68 shifts to the terminal which is connected to node 72 in the sensor circuit. Thereafter, the magnitude of current $-I_2$ is sufficient to hold the reed switch 68 in this position. After the foregoing switching is completed, current $-I_2$ flows from ground through switch 68, diodes 65 and 63, coil 59 and to node 73. Thus, the reference mode resistance of the entire current path, excluding that of sensor 69, is measured, and stored for comparison with the measurement mode resistance of the entire current path including sensor 69, which will be described next.

To obtain the measurement mode resistance for sensor 69, it is necessary to direct the constant current $I_2$ through substantially the same current path as in the reference mode except for the series inclusion of sensor 69. This is accomplished by the read, store and logic means 31: by (i) selectively switching to constant current $+I_2$ and (ii) the momentary application of potential $+V_1$ onto line 23. The momentary application of $+V_1$ is to assure that the reed of switch 68 will be connected with node 72, notwithstanding the change of current from $-I_2$ to $+I_2$. Thus, the application of the constant current $+I_2$ to node 73 causes the current path to be from node 73 through diodes 62 and 64, coil 59 and sensor 69 because diodes 63 and 65 are reverse biased. (It should be noted that neither in the reference mode, i.e., $-I_2$ momentarily augmented by $-V_1$, nor in the measurement mode, i.e., $+I_2$ momentarily augmented by $+V_1$, are the voltages at at node 73 sufficient to cause current to flow through both Zener diode 55 and diode 56.)

As was previously described for sensor 70, the resistance of sensor 69 is obtained by algebraically adding the resistance measured in the reference mode with the resistance measured in the measurement mode.

In order to make another measurement of the resistance of sensor 70, the reed of switch 68 must be switched back to the terminal which is connected to node 71 of the sensor circuit. This is done by selectively switching (via read, store and logic means 31) the constant current $+I_1$ from current source 27 onto line 23 and repeating the previously described process. Since $I_1$ is insufficient in magnitude to hold the reed of switch 68 in the position connecting it to node 72, it will automatically switch back to node 71.

Thus, while currents $\pm I_1$ are used to measure the parameter of interest sensed by sensor 70, currents $\pm I_2$ (together with potentials $\pm V_1$ for switching the switch 68) are used to measure the parameter of interests sensed by sensor 69.

The incorporation of the power supply 28 is for the exclusive purpose of limiting the dynamic voltage range required for constant current power supply 27. It will be apparent to those skilled in the art that power supply 28 may be eliminated if the dynamic voltage range of power supply 27 is sufficiently large. It will also be apparent that limiting the required dynamic voltage range of constant current power supply 27 results in increased stability and accuracy.

With reference to FIG. 3, an alternate embodiment of the present invention is described. In this embodiment, the operation of the sensor circuit is the same as that described with respect to the embodiment of FIG. 2. The difference lies in the configuration of the delatch coil circuit. More specifically, in this embodiment, the delatch coil 58 is coupled serially in the sensing current path from node 31 of motor windings 30 to sensor circuit input node 73, such path comprising electrically conducting line 35, fuse 47, switch 53 and the LC circuit comprising series inductor 54 and capacitor 67 to ground. The configuration of the latch coil circuit, including current transformer 33, latch coil 52, diodes 49 and 50 and resistor 48 is the same as heretofore described with respect to FIG. 2. The latch coil 52 is wound so as to add to the magnetic field of permanent magnet 19, while the delatch coil 58 is would about the permanent magnet 19 in magnetic opposition to the field thereof. The operation of the latch coil circuit of the embodiment of FIG. 3 is the same so that in the embodiment of FIG. 2.

A capacitor 90 (not included in the embodiment of FIG. 2) is connected between (i) the terminal of switch 53 which is coupled to the delatch coil 58 and (ii) circuit ground. The purpose of capacitor 90 is to provide enough stored energy for the continuation of current flow through delatch coil 58, after switch 53 first opens, to assure that the magnetic field of coil 58 persists long enough to keep switch 53 open, thereby avoiding chattering of the switch.

In operation, the currents $\pm I_1$ and $\pm I_2$ with the momentary application of $\pm V_1$ are not sufficient to cause the delatch coil to open the switch 53. However, when the negative potential $-V_2$, from power supply 29, is impressed onto line 23 by read, store and logic means 31 (not shown in FIG. 3), the resulting current through delatch coil 58 increases to a level sufficient to operate the switch 53. When switch 53 opens, the current through the delatch coil 58 is interrupted. However, as indicated above, the energy stored in capacitor 90 maintains the current flow through the coil 58 (by discharging through it) so as to assure the opening of the switch 53. One advantage of the above-described configuration of the delatch coil circuit is the elimination of the Zener diode 55 and diode 56 of FIG. 2.

Figure 4:
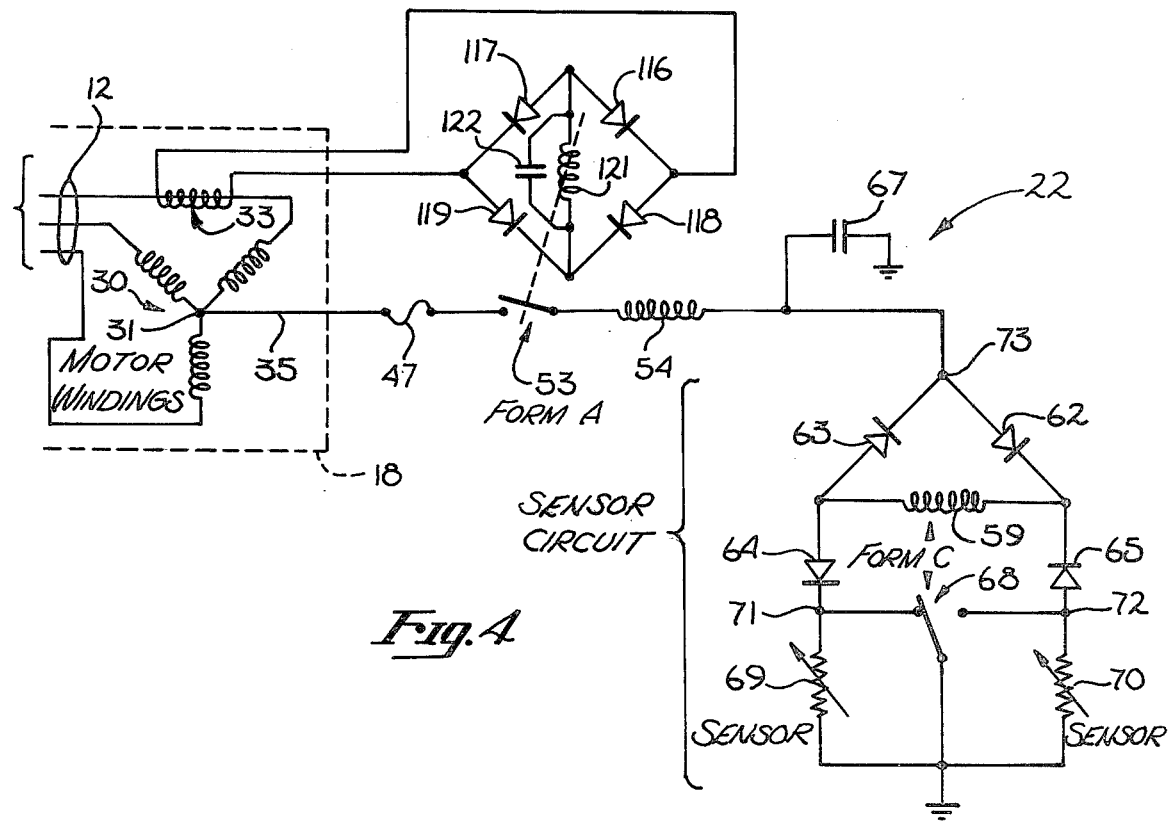
FIG. 4 is a schematic diagram showing another embodiment of the remote sensor package portion of the present invention wherein a full wave rectifier bridge circuit is used to control the state of the switching means instead of the latch coil and delatch coil circuits of FIG. 2.

With reference to FIG. 4, an alternate embodiment of the present invention is described. In this embodiment, the operation of the sensor circuit is also the same as that described with respect to the embodiment of FIG. 2. The difference lies in the switch 53 and in the circuitry which controls its state; i.e., whether it is opened or closed with respect to the sense current path.

In the embodiment of FIG. 4, the Form A reed switch 53 does not incorporate a permanent magnet such as magnet 19 of FIGS. 2 and 3. Control of the position of the reed of switch 53 is by means of electrical current through a latching coil 121, the latter being electrically coupled to a conventional full wave rectifier bridge, comprising diodes 116, 117, 118 and 119, as shown in FIG. 4. A smoothing capacitor 122 is coupled across the coil 121. The full-wave rectifier bridge is coupled to the secondary of a current transformer 33 which may be similar to the current transformer used in the embodiments of FIGS. 2 and 3.

In operation, when an A.C. current flows through the motor windings 30, and therefore through the primary of current transformer 33, the output of the secondary of the current transformer is fully rectified by the diodes 116–119, resulting in a D.C. current flowing through the coil 121. This D.C. current is sufficient in magnitude to close the reed switch 53. Capacitor 122 smooths the rectified A.C. current and prevents the switch 122 from chattering. When the A.C. power source 10 (not shown in FIG. 4) is turned off, there is no output from the secondary of current transformer 33, and therefore, no current flows through coil 121. Because reed switch 53 does not have a permanent magnet to latch it in the closed position once in that position, switch 53 opens when the A.C. power source is turned off. Consequently, when power to the motor and pump assembly 18 is turned off, the sensor package 22 is automatically decoupled therefrom.

The embodiment of FIG. 4 has the advantage of eliminating the latching feature and the delatch coil and circuit associated therewith. However, it has the disadvantage of not enabling the measurement of parameters of interest to be made when the A.C. powered device (e.g., motor) is not in operation. This disadvantage may be overcome, however, by use of an appropriately sized single phase auxiliary power supply (on the surface) coupled via the power cable 12 to the phase of downhole motor windings 30 to which the primary of current transformer 33 is coupled. Power from such an auxiliary source would energize coil 121 so as to maintain switch 53 in its closed position when the motor is not in operation.

Figure 5:
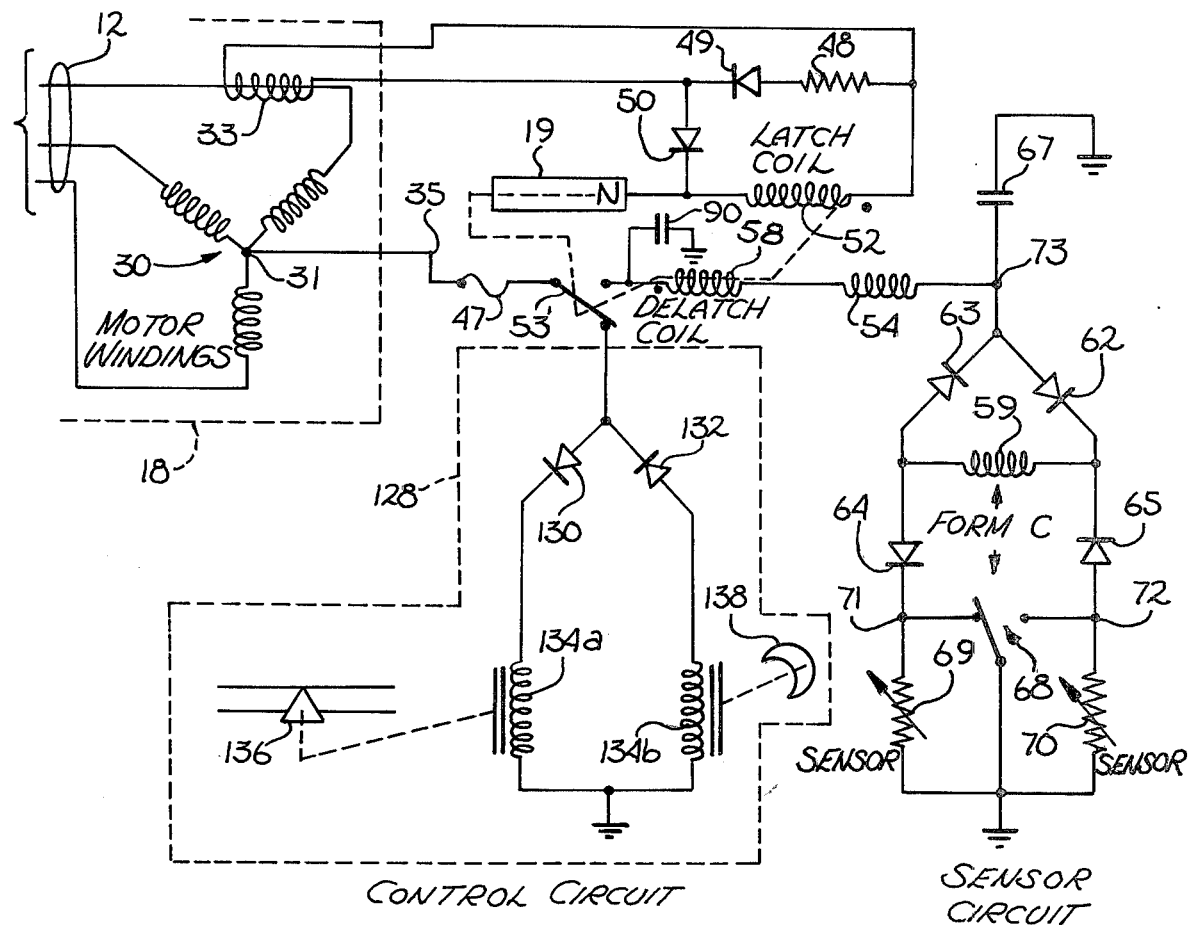
FIG. 5 is a schematic diagram of still another embodiment of the remote sensor package portion of the present invention, showing the inclusion of a control circuit and the means for selectively switching between the control circuit (for controlling certain operating functions) and the sensor circuit (for sensing certain parameters of interest).

With reference to FIG. 5, still another embodiment of the present invention is described. It is the same as that described with respect to FIG. 3 in all respects except (i) a single pole, double throw Form C switch 53' (preferably a reed switch) is used in place of the single pole, single throw switch 53 used in the embodiments of FIGS. 2–4, and (ii) either a second sensor circuit or a control circuit 128 is included and selectively coupled to the current path by the position of switch 53'. This, embodiment permits the inclusion and selection of additional sensors and/or the control of operational functions in addition to the parameter sensing capability provided by sensors 69 and 70.

In the embodiment of FIG. 5, the additional circuit 128 shown is a control circuit. It should be understood that the operation of any particular down-hole control circuit may require modification of the control and readout unit 25 so that the appropriate voltages and/or currents can be selectively provided to it. The structure and operation of control circuit 128 is now described.

As shown in FIG. 5, control circuit 128 comprises an electro-mechanical device 134a which is activated by a constant current (e.g., $+I_2$), directed through it by diode 130, and electro-mechanical device 134b which is activated by a constant current (e.g., $-I_2$) directed through it by diode 132. The diodes 130 and 132 are coupled to a terminal of switch 53' in the forward and reverse biased directions respectively. Thus, diode 132 blocks the flow of current $+I$ through electro-mechanical device 134b, while diode 130 blocks the flow of current $-I$ through electro-mechanical device 134a.

Electro-mechanical device 134a may be a solenoid used to operate a valve 136, while device 134b may be a solenoid used to operate a locking device 138. Those skilled in the art can readily envision numerous alternative control functions which can be implemented by the electro-mechanical devices 134a and 134b. Such control function may include, by way of illustration, (i) the switching in and out of a resistor(s) which limits the "in-rush" current to a motor; and (ii) the activation of a latching means designed to hold a pump in place in applications where the latter is placed down-hole rather than being affixed to a tubing string as in this description.

Thus, an instrumentation apparatus has been described for remote use with alternating current devices, such as, for example, a down-hole submersible motor and pump assembly, or a plunger relay. Sensing is accomplished through the power cable which carries power to the A.C. device, without the use of additional instrumentation leads. The sensors may be selectively coupled and decoupled from the A.C. device. The latter feature is particularly advantageous in submersible pumping applications where high voltage testing of the motor and power cable is done periodically. Means are also provided to switch between a plurality of remote sensors and/or control circuits in the invented apparatus. The entire system may be fabricated employing commercially available components. It should be obvious to those skilled in the art that constant currents $\pm I$, and $\pm I_2$ may be replaced by constant potentials of appropriate values and the impedances of the paths may be determined by appropriately measuring the current.

Thus, while the invention has been particularly shown and described with reference to preferred embodiments for use in a submersible pumping application, it should be understood that persons skilled in the art may make various changes in form and detail of the present invention without departing from the spirit and scope of the invention; and further, the the principles disclosed are susceptible of other applications which will be apparent to those skilled in the art. This invention, therefore, is not intended to be limited to the particular embodiments herein disclosed.

We claim:

1. In an installation having an alternating current operating device disposed remotely from a local control site and having a cable for carrying power from a locally disposed power source to said device, an instrumentation apparatus for monitoring at least one physical parameter of interest in the environment of said remote device, comprised of:
   (a) at least one sensor circuit disposed in the vicinity of said remote device, said sensor circuit comprising at least one sensing means responsive to a physical parameter and first and second electrically conducting paths, said first path being adapted to conduct only a signal of a first polarity and said second path being adapted to conduct only a signal of an opposite polarity, said first path bypassing said sensing means and said second path including said sensing means;
   (b) first switching means having at least first and second states coupled between said power cable and said sensor circuit in the vicinity of said remote device and distant from said local control site, said first state of said switching means coupling said sensor circuit to said power cable and said second state thereof decoupling said sensor circuit from said power cable, said first switching means including means responsive to DC of at least a predetermined magnitude applied to said power cable at said local control site for placing said first switching means in said second state;
   (c) means at said local control site for applying DC of at least said predetermined magnitude to said power cable;
   (d) means for generating a readout signal having selectable first and second opposing polarities, said generating means being disposed at said local control site and electrically coupled to said power cable;
   (e) means for determining said physical parameter from said readout signal, said parameter determining means being electrically coupled to said readout signal generating means;
   whereby when said first switching means is in its said first state, said readout signal of said first and second polarities may be sequentially conducted through said first and second paths of said sensor circuit.

2. The apparatus defined by claim 1 wherein said readout signal is a constant current and said sensor circuit comprises a plurality of diodes configured to conduct current of said first polarity through said first path thereof and to block current of said opposite polarity therethrough, and to conduct current of said opposite polarity through said second path thereof and to block current of said first polarity therethrough.

3. The apparatus defined by claim 2 wherein said readout signal generating means comprises at least one constant current source and polarity switching means.

4. The apparatus defined by claim 1 wherein said sensing means has an impedance which is responsive to said physical parameter, and said parameter determining means comprises means responsive to the impedance of said sensing means.

5. The apparatus defined by claim 4 wherein said means responsive to the impedance of said sensing means comprises comparator means for obtaining the difference between the impedance of the readout current path when the readout current path includes said first path of said sensor circuit and when the readout current path includes said second path of said sensor circuit, said impedance difference being attributable to the impedance of said sensing means.

6. In an installation having an alternating current operating device disposed remotely from a local control site and having a cable for carrying power from a locally disposed power source to said device, an instrumentation apparatus for monitoring at least one physical parameter of interest in the environment of said remote device, comprised of:
   (a) at least one sensor circuit disposed in the vicinity of said remote device, said sensor circuit comprising at least one sensing means responsive to a physical parameter and first and second electrically conducting paths, said first path being adapted to conduct only a signal of a first polarity and said second path being adapted to conduct only a signal of an opposite polarity, said first path bypassing said sensing means and said second path including said sensing means;
   (b) first switching means having at least first and second states coupled between said power cable and said sensor circuit, said first state of said first switching means coupling said sensor circuit to said power cable and said second state thereof decoupling said sensor circuit from said power cable, said first switching means comprising latch means and delatch means, said latch means being electrically coupled to said power cable by first coupling means and said delatch means being electrically coupled to said power cable by second coupling means, said latch means, when energized, being adapted to place said first switching means into its said first state and said delatch means, when energized in the absence of energy to said latch means, being adapted to place said first switching means into its said second state;
   (c) means for generating a readout signal having selectable first and second opposing polarities, said generating means being disposed at said local control site and electrically coupled to said power cable;
   (d) means for determining said physical parameter from said readout signal, said parameter determining means being electrically coupled to said readout signal generating means;
   whereby when said first switching means is in its said first state, said readout signal of said first and second polarities may be sequentially conducted through said first and second paths of said sensor circuit.

7. The apparatus defined by claim 6 wherein said first coupling means comprises a current transformer and rectifier means adapted to allow only unidirectional current to flow to said latch means;
   whereby said latch means is energized whenever alternating current is being carried by said power cable.

8. The apparatus defined by claim 6 wherein said first switching means further comprises magnet means having a magnetic field strength which is sufficient to maintain said first switching means in its said first state after said latch means has been energized, but insufficient to cause said first switching means to change from its said second to its said first position.

9. The apparatus defined by claim 6 having, in addition, means for generating a delatch potential, said delatch potential generating means being disposed at said control site and electrically coupled to said delatch means through a path comprising said power cable, said first switching means in its said first state and said second coupling means;

whereby said delatch potential energizes said delatch means.

10. The apparatus defined by claim 9 having in addition thereto capacitor means coupled to said delatch means, said capacitor means storing electrical energy during the presence of said delatch potential and discharging the same through said delatch means after said delatch potential causes said first switching means to change to its said second state;

whereby chattering of said first switching means is prevented.

11. The apparatus defined by claim 6 wherein said second coupling means comprises threshold means for conducting at a predetermined potential;

whereby said delatch means is energized only when a potential greater than said predetermined potential appears on said power cable.

12. The apparatus defined by claim 11 wherein said threshold means is a Zener diode.

13. The apparatus defined by claim 1 wherein said first switching means comprises a coil electrically coupled to said power cable by first coupling means, said first switching means being adapted to being in its said first state when said coil is energized and in its said second state when said coil is not energized.

14. The apparatus defined by claim 13 wherein said first coupling means comprises full wave rectifying means.

15. The apparatus defined by claim 1 having in addition thereto A.C. filtering means serially coupled between said power cable and said sensor circuit;

whereby said filtering means reduces the transmission of A.C. noise and power to said sensor circuit.

16. In an installation having an alternating current operating device disposed remotely from a local control site and having a cable for carrying power from a locally disposed power source to said device, an instrumentation apparatus for monitoring at least one physical parameter of interest in the environment of said remote device, comprised of:

(a) at least one sensor circuit disposed in the vicinity of said remote device, said sensor circuit comprising at least one sensing means responsive to a physical parameter and first and second electrically conducting paths, said first path being adapted to conduct only a signal of a first polarity and said second path being adapted to conduct only a signal of an opposite polarity, said first path bypassing said sensing means and said second path including said sensing means;

(b) first switching means having at least first and second states coupled between said power cable and said sensor circuit, said first state of said first switching means coupling said sensor circuit to said power cable and said second state thereof decoupling said sensor circuit from said power cable;

(c) means for generating a readout signal having selectable first and second opposing polarities, said generating means being disposed at said local control site and electrically coupled to said power cable;

(d) means for determining said physical parameter from said readout signal, said parameter determining means being electrically coupled to said readout signal generating means;

whereby when said first switching means is in its said first state, said readout signal of said first and second polarities may be sequentially conducted through said first and second paths of said sensor circuit;

said sensor circuit comprising first and second sensing means and second switching means having first and second states, said first path through said sensor circuit including said second switching means when said second switching means is in its first state and including said second sensing means when said second switching means is in its second state, and said second path through said sensor circuit including said first sensing means when said second switching means is in its said first state and including said second switching means when said second switching means is in its said second state.

17. The apparatus defined by claim 16 wherein the state of said second switching means is responsive to a predetermined potential, and having in addition thereto, means for generating said potential disposed at said control site, said potential generating means being electrically coupled to said second switching means through a path comprising said power cable and said first switching means in its said first state.

18. In an installation having an alternating current operating device disposed remotely from a local control site and having a cable for carrying power from a locally disposed power source to said device, an instrumentation apparatus for monitoring at least one physical parameter of interest in the environment of said remote device and for controlling at least one function of said device, comprised of:

(a) at least one sensor circuit disposed in the vicinity of said remote device, said sensor circuit comprising at least one sensing means responsive to a physical parameter and first and second electrically conducting paths, said first path being adapted to conduct only a signal of a first polarity and said second path being adapted to conduct only a signal of an opposite polarity, said first path bypassing said sensing means and said second path including said sensing means;

(b) at least one signal-responsive control means;

(c) first switching means having at least first and second states coupling said power cable to said sensor circuit and to said control means, said first state of said first switching means coupling said sensor circuit to said power cable, and said second state thereof coupling said control means to said power cable;

(d) means for generating a signal having selectable first and second opposing polarities, disposed at said local control site and electrically coupled to said power cable;

(e) means for determining said physical parameter from said signal, said parameter determining means being electrically coupled to said signal generating means;

whereby when said first switching means is in its said first state, said signal of said first and second polarities may be sequentially conducted through said first and second paths of said sensor circuit; and when said first switching means is in its said second state a signal generated by said generating means may cause said control means to respond.

19. In an installation in which conductors of a cable carry AC power from a power source to an AC operating device disposed remotely from said source and at least some of the same cable conductors carry DC signals from a control site to instrumentation apparatus disposed remotely from said control site, the improvement comprising switching means disposed remotely from said control site for connecting said apparatus to and disconnecting said apparatus from said cable, coupling means reponsive to AC applied to said cable, and isolated from DC applied to said cable, for operating said switching means to connect said apparatus to said cable, and means responsive to DC of at least a predetermined magnitude applied to said cable for operating said switching means to disconnect said apparatus from said cable.

20. The improvement defined by claim 19, wherein said switching means comprises a mechanical switch and a latch coil for closing said switch when the coil is energized, and wherein said coupling means energizes the latch coil in response to AC applied to said cable.

21. The improvement defined by claim 20, wherein said coupling means comprises a transformer coupled to said cable and rectifier means connecting said transformer to said latch coil.

22. In an installation in which conductors of a cable carry AC power from a power source to an AC operating device disposed remotely from said source and at least some of the same cable conductors carry DC signals from a control site to instrumentation apparatus disposed remotely from said control site, the improvement comprising switching means disposed remotely from said control site for connecting said apparatus to and disconnecting said apparatus from said cable, and coupling means responsive to AC applied to said cable, and isolated from DC applied to said cable, for operating said switching means to connect said apparatus to said cable, said switching means comprising a mechanical switch and a latch coil for closing said switch when the coil is energized, said coupling means energizing the latch coil in response to AC applied to said cable, said switching means also comprising means for holding said switch closed independently of said latch coil, a delatch coil for opening said switch when the delatch coil is energized, and means for energizing the delatch coil in response to DC applied to said cable.

23. The improvement defined by claim 22, wherein said means for energizing said delatch coil is responsive only to DC of a predetermined polarity and of at least a predetermined magnitude.

24. The improvement defined by claim 22, wherein said switch disconnects the delatch coil from the cable when the switch is open.

25. In an installation in which conductors of a cable carry AC power from a power source to an AC operating device disposed remotely from said source and at least some of the same cable conductors carry DC signals from a control site to instrumentation apparatus disposed remotely from said control site, the improvement comprising switching means disposed remotely from said control site for connecting said apparatus to and disconnecting said apparatus from said cable, and coupling means responsive to AC applied to said cable, and isolated from DC applied to said cable, for operating said switching means to connect said apparatus to said cable, said apparatus comprising first and second paths branching from the same node connected to said cable by the switching means, the first path being adapted to conduct only DC of one polarity and the second path being adapted to conduct only DC of the opposite polarity, whereby different polarity DC signals may be applied to said cable at said control site and routed through said first path or said second path selectively.

26. The improvement defined by claim 25, wherein said apparatus further comprises a sensor having a variable impedance to be measured from said control site, said first path bypassing said sensor, said second path including said sensor, and each of said paths having substantially the same total impedance value except for the value of the impedance of said sensor, whereby the impedance of said sensor can be determined from said control site by measuring the impedance of said cable in series with the impedance of said second path, measuring the impedance of said cable in series with the impedance of said first path, and subtracting one measurement result from the other.

27. The improvement defined by claim 26, wherein said apparatus comprises another sensor having a variable impedance to be measured, and wherein said apparatus comprises further switching means responsive to DC of at least a predetermined magnitude applied to said cable for modifying said paths so that said first path includes said other sensor, said second path bypasses said other sensor, and the first-mentioned sensor is effectively removed from said second path.

28. The improvement defined by claim 27, wherein the further switching means comprises a single-pole, double-throw mechanical switch having a first position in which the switch shunts said other sensor and a second position in which the switch shunts the first-mentioned sensor and comprises a coil for operating said switch when the coil is energized by DC of a predetermined polarity and at least a predetermined magnitude, said first path including a first rectifier poled in a first direction connecting said node to one end of said coil, and a second rectifier poled in the same direction connecting the other end of said coil to said other sensor, said second path including a third rectifier poled in the opposite direction connecting the first-mentioned sensor to said one end of said coil, and a fourth rectifier poled in said opposite direction connecting said other end of said coil to said node.

29. The improvement defined by claim 28, wherein said installation includes means at said control site for applying DC signals of different constant magnitudes to said cable.

30. The improvement defined by claim 29, wherein said installation includes means at said control site for reversing the polarity of at least one DC signal applied to the cable.

* * * * *